(12) United States Patent
Tian et al.

(10) Patent No.: US 8,694,399 B2
(45) Date of Patent: Apr. 8, 2014

(54) PRICING MORTGAGE-BACKED SECURITIES

(75) Inventors: Xusheng Tian, Wappingers Falls, NY (US); Alexander Belikoff, Brooklyn, NY (US)

(73) Assignee: Bloomberg Finance L.P., New York, NY (US)

( * ) Notice: Subject to any disclaimer, the term of this patent is extended or adjusted under 35 U.S.C. 154(b) by 1025 days.

(21) Appl. No.: 12/558,115

(22) Filed: Sep. 11, 2009

(65) Prior Publication Data

US 2010/0063915 A1    Mar. 11, 2010

Related U.S. Application Data

(60) Provisional application No. 61/096,247, filed on Sep. 11, 2008.

(51) Int. Cl.
*G06Q 40/00* (2012.01)
(52) U.S. Cl.
USPC ............................. 705/35; 705/36 R; 705/37
(58) Field of Classification Search
USPC ..................................................... 705/35–37
See application file for complete search history.

(56) References Cited

U.S. PATENT DOCUMENTS

| | | | |
|---|---|---|---|
| 5,966,700 A * | 10/1999 | Gould et al. | 705/38 |
| 6,233,566 B1 * | 5/2001 | Levine et al. | 705/36 R |
| 6,513,019 B2 * | 1/2003 | Lewis | 705/35 |
| 6,839,686 B1 * | 1/2005 | Galant | 705/36 R |
| 7,010,510 B1 | 3/2006 | Schellhorn | |
| 7,113,190 B2 * | 9/2006 | Heaton | 345/440 |
| 7,171,385 B1 | 1/2007 | Dembo et al. | |
| 7,236,952 B1 * | 6/2007 | D'Zmura | 705/36 R |
| 7,418,418 B2 * | 8/2008 | Wizon et al. | 705/36 R |
| 7,430,532 B2 * | 9/2008 | Wizon et al. | 705/36 R |
| 7,529,703 B2 * | 5/2009 | Benzschawel et al. | 705/36 R |

(Continued)

OTHER PUBLICATIONS

Booth et al., Cash Flow Models for Pricing Mortgages, Journal, Nov. 2000, 17 pgs., London, England.

(Continued)

*Primary Examiner* — Gregory Johnson
(74) *Attorney, Agent, or Firm* — Frank J. DeRosa; Frommer Lawrence & Haug LLP

(57) ABSTRACT

Systems, methods and computer program products stored on a computer readable medium or media are described for providing pricing of mortgage-backed securities and other financial instruments. Multiple cashflow paths resulting from different interest rate development scenarios are consolidated into a single cashflow path. A continuously compounded interest rate spread ("equivalent cc spread") corresponding to the option adjusted spread prevailing at the market is determined, as is a relationship between the two. Reformulating computations of option adjusted spreads and prices using an equivalent cc spread and factoring out assumption changes approximates individual cashflow path and interest rate path calculations and allows use of consolidated cashflows calculations as a very good approximation. In some embodiments, the consolidated cashflow and the relationship between two spreads is employed to compute the value of the financial instrument, as a very good approximation, at a later time, so that the price reflects changes in the market yield curve and the option adjusted spread. For example, interest rate paths, cashflow paths, consolidated cashflow paths, discount factors and the equivalent cc spread are computed at market close, and only the consolidated cashflow paths, discount factors and the equivalent cc spread (and not the interest rate paths and cashflow paths) are stored for later on-demand use when the discount factors are adjusted to reflect the then current market environment.

15 Claims, 4 Drawing Sheets

(56) References Cited

U.S. PATENT DOCUMENTS

| | | |
|---|---|---|
| 7,574,396 B2 * | 8/2009 | Kalotay et al. .................. 705/37 |
| 7,689,493 B1 * | 3/2010 | Sullivan et al. ............. 705/36 R |
| 7,707,104 B2 * | 4/2010 | Kalotay et al. .................. 705/38 |
| 7,725,373 B2 * | 5/2010 | Cooper ........................... 705/35 |
| 7,801,789 B1 * | 9/2010 | Cohler et al. .............. 705/36 R |
| 7,835,967 B2 * | 11/2010 | Phelps et al. .............. 705/36 R |
| 7,966,237 B2 * | 6/2011 | Creed et al. ...................... 705/35 |
| 7,966,252 B2 * | 6/2011 | Shilpiekandula et al. ...... 705/38 |
| 7,974,894 B2 * | 7/2011 | Baron et al. ..................... 705/35 |
| 8,005,740 B2 * | 8/2011 | Arnott et al. .............. 705/36 R |
| 8,306,892 B1 * | 11/2012 | Gross et al. ................. 705/36 R |
| 8,510,203 B2 * | 8/2013 | Corcoran et al. ............... 705/37 |
| 8,548,884 B2 * | 10/2013 | Meucci ........................... 705/35 |
| 2002/0035530 A1 * | 3/2002 | Ervolini et al. ................. 705/36 |
| 2002/0065752 A1 * | 5/2002 | Lewis .............................. 705/35 |
| 2002/0095369 A1 * | 7/2002 | Kaplan et al. ................... 705/37 |
| 2002/0161690 A1 * | 10/2002 | McCarthy et al. .............. 705/37 |
| 2002/0188543 A1 * | 12/2002 | Wizon et al. .................... 705/36 |
| 2002/0188544 A1 * | 12/2002 | Wizon et al. .................... 705/36 |
| 2002/0198811 A1 * | 12/2002 | Wizon et al. .................... 705/36 |
| 2002/0198812 A1 * | 12/2002 | Wizon et al. .................... 705/36 |
| 2003/0018558 A1 * | 1/2003 | Heffner et al. ................. 705/37 |
| 2003/0023525 A1 * | 1/2003 | Chen ............................... 705/35 |
| 2003/0093351 A1 * | 5/2003 | Sarabanchong ................. 705/36 |
| 2003/0105696 A1 * | 6/2003 | Kalotay et al. ................... 705/35 |
| 2003/0182220 A1 * | 9/2003 | Galant ............................. 705/36 |
| 2005/0131790 A1 * | 6/2005 | Benzschawel et al. ......... 705/35 |
| 2005/0182702 A1 * | 8/2005 | Williams, III .................. 705/35 |
| 2005/0209959 A1 * | 9/2005 | Tenney ............................ 705/39 |
| 2005/0267828 A1 * | 12/2005 | Baron et al. ..................... 705/35 |
| 2006/0253360 A1 * | 11/2006 | Gould ............................. 705/35 |
| 2007/0016509 A1 * | 1/2007 | Vogel .............................. 705/37 |
| 2007/0078744 A1 * | 4/2007 | Koss et al. .................. 705/36 R |
| 2007/0083452 A1 * | 4/2007 | Mayle et al. ................. 705/36 R |
| 2007/0192228 A1 * | 8/2007 | Phelps et al. .............. 705/36 R |
| 2007/0294156 A1 * | 12/2007 | Hughes et al. ............. 705/36 R |
| 2008/0288416 A1 * | 11/2008 | Arnott et al. .............. 705/36 R |
| 2011/0016042 A1 * | 1/2011 | Cho et al. ........................ 705/38 |

OTHER PUBLICATIONS

Chen, Simulation-Based Pricing of Mortgage-Backed Securities, Journal, Winter 2004, 7 pgs., Washington, DC.

Stein, et al., Analysis of Mortgage Backed Securities, White Paper, Jan. 5, 2007 & Sep. 3, 2008, 30 pgs., United States.

Stein, et al., Mortgage OAS Analysis, White Paper, Feb. 16, 2006, 106 pgs., United States.

* cited by examiner

PRICING MORTGAGE-BACKED SECURITIES

CROSS REFERENCE TO RELATED APPLICATION

This application claims priority of U.S. Provisional Application Ser. No. 61/096,247, filed Sep. 11, 2008, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention disclosed herein relates generally to the field of securities whose value is based on future cashflows, and analysis thereof, including providing valuations thereof. One example of such a security is mortgage-backed securities (MBSs). Other securities (or derivatives, instruments, etc.) to which the disclosure herein applies are those whose value is interest path dependent. The invention relates to methods, systems and computer program products for implementing such valuation and analysis.

MBS instruments, which comprise pools of mortgages and collateralized mortgage obligations (CMOs), are analyzed for various reasons including computing valuations and metrics such as pricing, effective duration and key rate durations, and sensitivity to market variables. MBS instrument valuations and metrics may be provided for different interest rate models and for different market scenarios within an interest rate model. An interest rate model "predicts" what the interest rates will be in the future over a specified period of time based on model assumptions and/or parameters obtained from past market behavior. Since future interest rates are uncertain, a credible interest rate model offers many different possible "paths" for future interest rate dynamics. For example, an "exogenous" interest rate model uses the current yield curve as a starting point in its "prediction" of future interest rates. One interest rate model currently in use assumes normal dynamics of instantaneous "short" rate driven by two stochastic factors (so-called two factor Hull-White model). The specific dynamics are defined by the following parameters: current yield curve; ATM (at-the-money) swaption implied volatilities for 2-year and 10-year tenors for different maturities; mean reversion of each of the 2 stochastic factors (assumed constant); and correlation between the factors.

MBS analytics strive to answer various questions about the behavior of an instrument based on the change in the market. MBS valuations involve interest rate path simulations and cashflow computations. MBS instruments may have many possible interest rate paths along which cashflows may be generated dependent on interest rates, prepayments, defaults, and other market variables in general. Interest rate paths, which each can comprise a series of future interest rates on a specified schedule based on an interest rate model, can be simulated based on current interest rate term structure and ATM volatilities (A simulated interest rate path (or paths) is referred to herein as an "interest rate path" (or "paths")). Cashflow paths are computed based on structure of MBS, interest rate paths, prepayment and default assumptions, and other conditions.

Methodologies for computing such valuations and metrics, and for simulating interest rate paths and for computing cashflows are known in the art, and are discussed, for example, in: *Analysis of Mortgage Backed Securities*, Harvey J. Stein, Alexander Belikoff, Kirill Levin and Xusheng Tian, Jan. 5, 2007 & Sep. 3, 2008; *Mortgage OAS Analysis*, Harvey Stein, Feb. 16, 2006; *A Theoretical and Numerical Analysis of Collateralized Mortgage Obligations*, Bjornar Andre Ulstein, Master Thesis in Financial Economics, The Norwegian School of Economics and Business Administration, Jun. 18, 2008; *Fixed-Income Securities and Derivatives Handbook*, Moorad Choudhry, Bloomberg Press, Princeton, N.J., 2005; and *Cash Flow Models for Pricing Mortgages*, Philip Booth and Duncan Walsh, Research Paper 2000.02, City University Business School, London, November 2000, the entire disclosures of all of which are incorporated herein by reference.

Generally, the price, or present value, of an MBS instrument is the average of its discounted cashflows along each simulated cashflow path and along each simulated interest rate path. For example, see Expression 1 below. (The Expressions referred to herein may be found in the mathematical presentation below.) A discount factor is the present value of a unit of currency due to be paid at the end of a given period.

Pricing of MBS instruments involves non-linear analyses, and typically includes the use of Monte Carlo simulations, e.g., computational algorithms that rely on repeated random sampling to compute their results, which involve significant complexity, computer processing and computer storage resources. This makes such simulations very expensive for on-demand use, even when used with variance reduction techniques.

Because of complexity, cost and resource requirements, MBS valuations typically include two stages of processing performed at different times. In a first stage of processing (Stage 1), a number of interest rate paths are simulated and cashflow paths, e.g., a sequence of future payments made by the MBS instrument on a specified schedule, are computed for each interest rate path.

In Stage 1 processing in this previous approach, for a particular interest rate model, all of the interest rate paths are generated (and stored), and used to compute the cashflow paths along each of the interest rate paths for each market scenario in the valuation. In addition, Stage 1 processing also computes the discount factors for each cashflow path. This processing is performed once for a concerned instrument or set of instruments and saved for use in Stage 2 processing. Since Stage 1 processing typically involves large numbers of interest rate paths and cashflow path computations, which consumes significant computer processing and storage resources, such processing is typically run on a scheduled basis, e.g., nightly, as opposed to on-demand, e.g., when an investor requests a price for an instrument.

In a second stage of processing (Stage 2), pricing is computed using the previously computed cashflow paths and discount factors, and the current market environment for the particular instrument, i.e., observable market "parameters" at a given time which may vary in time and which are not specific to any instrument being analyzed. For example, these parameters may include the interest rate model parameters discussed above.

Stage 2 processing is performed on demand typically hours after or the day after Stage 1 processing. This allows very fast on-demand calculation of the MBS price based on the current market environment and the interest rate paths and cashflow paths previously calculated in Stage 1 processing, while reflecting changes in the market environment since the Stage 1 processing.

However, while Stage 1 processing and Stage 2 processing both are based on the then current market environment, since the processing takes place at different times or on different days, the market environments on which the Stage 1 and Stage 2 processing are based are typically different. For example, Stage 1 processing is performed overnight based on the previous day's market environment and Stage 2 processing is performed on demand the next day based on the current day's market environment. Therefore, pricing of MBS instruments using this previous approach may not accurately reflect the market environment at the time of the on-demand Stage 2 processing.

Also, while the current two stage approach may be suitable for less complex valuations, e.g., involving lower numbers of market scenarios and interest rate paths, because of complexity and required resources, the current two stage approach may not be scalable for more complex valuations involving larger numbers of market scenarios. For example, the current two stage approach may be suitable with respect to processing and storage resources and timeliness for a valuation including, e.g., three market scenarios (the current market environment; parallel shift up from the current market environment; and parallel shift down from the current market environment) and 32 interest rate paths (which requires 96 cashflow path computations). However, the current two stage approach may not be suitable from a quantitative standpoint for more complex MBS valuations involving larger numbers of scenarios and/or interest rate paths because of the increased processing and storage requirements.

Additionally, different investors may have differing views as to what variables most appropriately represent the market environment, and may want price, option adjusted spread (OAS), effective duration, key rate durations and other metrics computed for an MBS instrument in such a manner that the investor can specify the market environment. For example, the investor may desire to choose a specific type and date of a yield curve, may provide a custom curve, or may change the inputs for the analysis (price or OAS). However, the current two stage processing approach does not easily accommodate user-selected variables and metrics.

SUMMARY OF THE INVENTION

Throughout, reference is made to an embodiment or embodiments of the invention. Applicants do not intend, and it is to be understood, that the invention disclosed herein is not limited to such embodiments. Embodiments of the invention described herein provide for methods, systems and computer readable media useful to provide pricing of an MBS instrument, e.g., providing a price given an OAS, or providing an OAS given a price, under various scenarios, conditions and assumptions. While various embodiments of the invention are described herein with respect to MBS instruments, it is to be understood that the invention has application to other securities, derivatives and instruments, e.g., whose value is based on cashflows and/or which are interest path dependent.

Various embodiments of the invention comprise methods, systems and computer program products which implement the functionality described herein.

According to one or more embodiments of the invention, pricing an MBS instrument for a particular interest rate model comprises: computing one or more consolidated cashflow paths, each from a plurality of simulated cashflow paths, each based on a simulated interest rate path, and computing the change in price or OAS for the instrument using only a previously generated consolidated cashflow path or paths with associated relationship parameters, e.g., computing the price of the MBS instrument comprising discounting the consolidated cashflow(s) obtained from the consolidated cashflow path(s).

According to one or more embodiments of the invention, pricing an MBS instrument for a particular interest rate model comprises: computing one or more consolidated cashflow paths, each from a plurality of simulated cashflow paths, each based on a simulated interest rate path; computing discount factors using a spread to a continuously compounded interest rate curve equivalent to a provided or computed OAS (referred to herein as the "equivalent cc spread") and a relationship between the equivalent cc spread and the OAS; and discounting the consolidated cashflow(s) obtained from the consolidated path(s) using the computed discount factors.

In one or more embodiments, discount factors are computed based on a market environment that exists when the consolidated cashflow path(s) are computed, and the discount factors are adjusted to reflect a market environment subsequent to and different from the market environment used to generate the discount factors. Due to change in OAS, the discount factors are adjusted based on knowledge of all discount factors for all simulation paths. This is discussed below under the heading "Compute the consolidated cashflow." However, adjusting by a spread to a continuously compounded rate is a simple multiplication that does not depend on a simulation path and hence does not require knowledge of all interest rates in order to perform such an adjustment. The change in OAS is mapped to a change in a spread to the continuously compounded rate.

According to one or more embodiments of the invention, computation of at least the interest rate and cashflow paths of the particular interest rate model (and scenario), and the discount factors for each path occurs at one time or interval based on a then current market environment, and computation of the adjusted discount factors and the discounted consolidated cashflows occurs at subsequent time or interval when the market environment is expected to or has changed. For example, at least the interest rate and cashflow paths, the discount factors for each path, the consolidated cashflow paths and the equivalent cc spread are computed at the end of a day based on that day's market environment, while the adjusted discount factors and the discounted consolidated cashflows are computed on demand the next day based on the then current market environment. According to some embodiments, zero coupon bond prices are used to adjust the discount factors, for example as described by the expressions below.

According to one or more embodiments of the invention, processing can be performed in two stages similar to the previous approach. In a first stage, for the selected interest rate model and market scenarios: the interest rate paths are simulated; the cashflow paths are calculated; the consolidated cashflow paths are calculated; the discount factors are computed; and the equivalent cc spread is computed and the relationship between the equivalent cc spread and the OAS is determined. In this first stage, the consolidated cashflows, the equivalent cc spread, the relationship between the equivalent cc spread and the OAS, and the discount factors are stored, but the interest rate paths, the cashflow paths and the discount factors need not be stored, thereby reducing the use of computer processing and computer storage resources. In a second stage of processing: the discount factors according to the current market environment are computed; the stored consolidated cashflow paths, the equivalent cc spread, and the relationship between the equivalent cc spread and the OAS are retrieved, and the consolidated cashflows are computed using the adjusted discount factors. The second stage processing is performed on demand typically hours after or the day after the first stage processing.

According to one or more embodiments of the invention, the equivalent cc spread and the relationship between the equivalent cc spread and the OAS are computed based on the same market environment as are computation of the interest rate model's interest rate and cashflow paths, and the discount factors for each path. According to one or more embodiments, all of the above stage 1 computations can be performed on demand prior to Stage 2 processing, i.e., under the same market environment, in a timely manner, particularly for less complex interest rate models. The discount rates are adjusted when the input OAS has changed (e.g., moved by the spread amount). However, if the OAS has not changed, adjustment of discount factors is not needed.

In the previous approach, the shift or spread used to compute the cashflow paths along the various interest rate paths for each scenario is relative to the continuously compounded rate. Therefore, computing the discount factors involves a parallel shift up or down, which is independent of the specific interest rate path, and therefore is not intensive or complicated. However, computing the consolidated cashflow path for each scenario relative to an interest rate that is not continuously compounded (e.g., a semi-annually compounded forward rate curve), involves a relationship between the spread and the discount factors that is not a simple parallel shift up or down and depends on the actual interest rate information on each path, which is non-trivial and requires that all interest rate paths and cashflow paths be stored to compute a price. To avoid this complexity, one or more embodiments of the invention computes pricing using consolidated cashflow paths, the equivalent cc spread, and the relationship between this equivalent cc spread and the OAS.

Regarding the accuracy of valuations performed in accordance with one or more embodiments of the invention, when the consolidated cashflows are calculated based on the same market environment as the interest rate paths and the cashflow paths, with or without a different input price/OAS and discount factor adjustment, then the pricing results are identical to the pricing results achieved by the prior approach (up to the numerical error of a rootfinder, or approximately about 1e-9 on 32-bit computers). For a changed market environment, e.g., the consolidated cashflows are computed based on one market environment and the discount factors are adjusted based on another market environment, the results are a very quick and close approximation and provide commercially acceptable pricing, particularly when the actual market environment is close to that when the consolidated cashflows were computed.

According to one or more embodiments of the invention, after closing of the relevant financial market, the market closing environment is saved in relation to the concerned instrument(s), and where the same environment applies to more than one instrument, that environment is saved for all of the instruments having the same environment. However, users can input their own price/OAS to compute OAS/price, and other sensitivity (for example, effective duration, key rate durations, etc.).

According to one or more embodiments of the invention, pricing of MBS instruments using consolidated cashflow paths can be performed in changing market environments and under different investor assumptions. For example, price, OAS, effective duration, key rate durations, and other metrics for MBS instruments are computed in such a manner that an investor (e.g., user, client, etc.) can specify the market environment (e.g., pick a specific type and date of a yield curve or provide a custom curve) as well as change the inputs for the analysis (price or OAS). Such pricing can be provided, e.g., on demand. Thus, the price of an MBS instrument can be computed under a specific calculation scenario, and subject to various instrument sensitivities, e.g., to OAS, by creating appropriate scenarios and pricing the instrument under those scenarios.

The computations referred to herein may be executed by at least one computer having access to storage device(s) and/or memory which store financial information related to the financial instrument, and programming stored on a computer readable medium or media.

BRIEF DESCRIPTION OF THE DRAWINGS

The invention is illustrated in the figures of the accompanying drawings, which are meant to be exemplary and not limiting, and in which like references are intended to refer to like or corresponding structure and/or functionality, etc.

DETAILED DESCRIPTION

Figure 1:
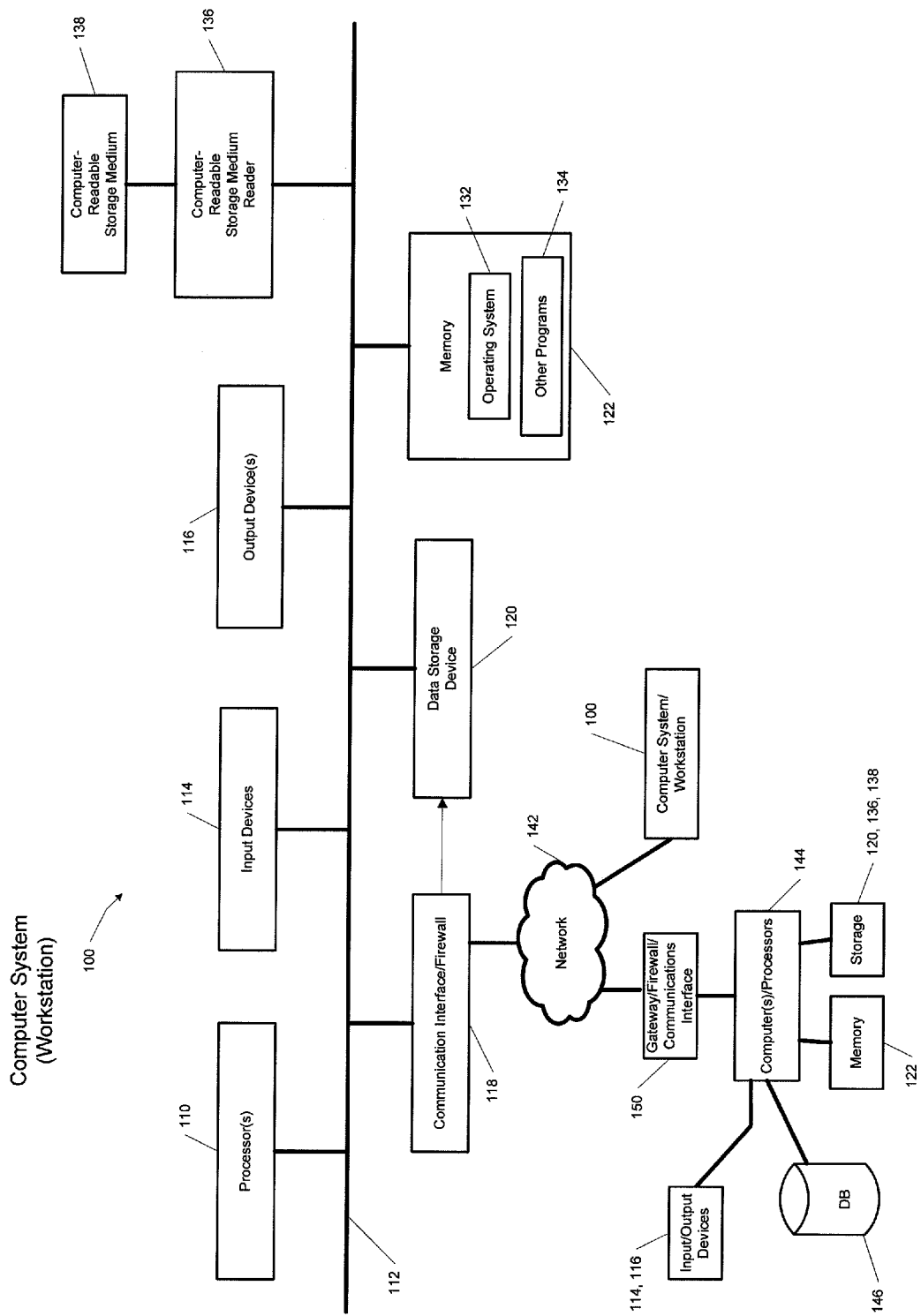
FIG. 1 is a block diagram depicting an exemplary computer system with which embodiments of the invention may at least partially be implemented.

Embodiments of the invention may be implemented by systems using one or more programmable digital computers and computer readable storage media. FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one computer readable medium or data storage device 120 such as a magnetic disk or an optical disk and memory 122 such as Random-Access Memory (RAM), each coupled to the communications channel 112. The communications interface 118 may be coupled to a network 142.

One skilled in the art will recognize that many variations of the system 100 are possible, e.g., the system 100 may include multiple channels or buses 112, various arrangements of storage devices 120 and memory 122, as different units or combined units, one or more computer-readable storage medium (CRSM) readers 136, such as, e.g., a magnetic disk drive, magneto-optical drive, optical disk drive, or flash drive, multiple components of a given type, e.g., processors 110, input devices 114, communications interfaces 118, etc.

In one or more embodiments, computer system 100 communicates over the network 142 with at least one another computer 144, which may comprise one or more host computers and/or server computers and/or one or more other computers, e.g. computer system 100, performing host and/or server functions including web server and/or application server functions. In one or more embodiments, a database 146 is accessed by the at least one other computer 144. The at least one other computer 144 may include components as described for computer system 100, and other components as is well known in the computer arts. Network 142 may comprise one or more LANS, WANS, intranets, the Internet, and other networks known in the art. In one or more embodiments, computer system 100 is configured as a work station that communicates with the at least one other computer 144 over the network 142. In one or more embodiments, computer system 100 is configured as a client in a client-server system in which the at least one other computer comprises one or more servers. Additional computer systems 100, any of which may be configured as a work station and/or client computer, may communicate with the at least one other computer 144 and/or another computer system 100 over the network 142.

The terms "client" and "server" may describe programs and running processes instead of or in addition to their application to computer systems described above. Generally, a (software) client may consume information and/or computational services provided by a (software) server.

Various embodiments of the invention are described herein with respect to MBS instruments. However, it is to be understood that the invention has application to other securities, derivatives and instruments that are interest path dependent.

Figure 2:
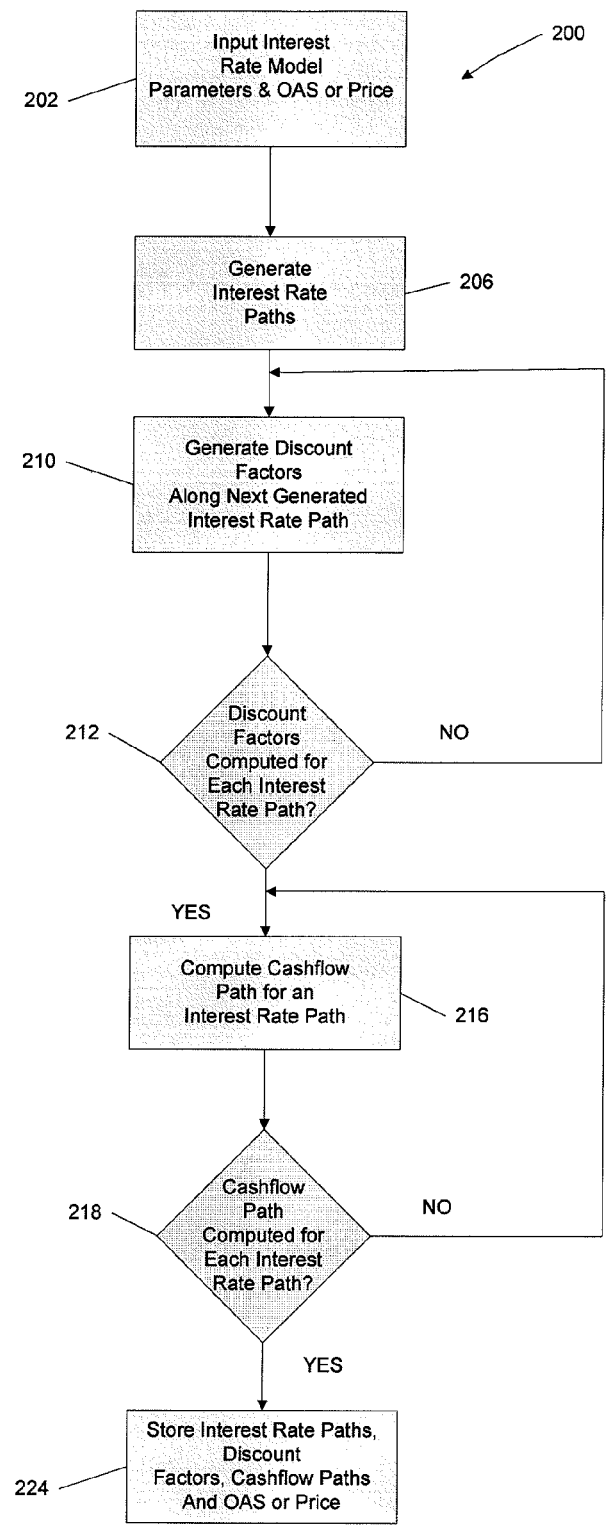
FIG. 2 is a flow diagram of a process for generating/computing of interest rate paths, cashflow paths and discount factors which can be used in accordance with one or more embodiments of the invention.

FIG. 2 illustrates an exemplary flow for an embodiment of process 200 for generating the interest rate paths, computing the cashflow paths along each interest rate path, and generating the discount factors along each interest rate path. In block 202 of FIG. 2, interest rate model parameters such as price or OAS; market environment variables (yield curve, volatilities, indices, etc.); interest rate model assumptions; and prepayment and default assumptions are input to the process. Currently, users can affect prepayment and default indirectly by either changing the parameters of the interest rate model or by changing some loan attributes (e.g. LTV), which ultimately affects modeled parameters.

In block 206, interest rate paths are generated based on the interest rate model parameters. In the "do loop" represented by blocks 210 and 212, discount factors are generated along each interest rate path. In the "do loop" represented by blocks 216 and 218, a cashflow path CF(i, j) computed for each generated interest rate path. In block, 224, the generated interest rate paths and discount factors, and the computed cashflow paths are stored.

The functions in block 206 may be performed by the at least one computer 144, e.g., as an interest rate engine, and in one or more embodiments, as previously performed. (See, for example, Expression 6.) The discount factors in block 210 may be generated by the at least one computer 144, as previously performed. The functions in block 216 may be performed by the at least one computer 144, e.g., as a cashflow engine, and in one or more embodiments, as previously performed. Blocks 206, 210 and 216 may be implemented by a Monte Carlo based method, as previously performed.

While the flow for process 200 shows values and parameters being input to the process within one block (202), it is to be understood that they may be input at any appropriate point in the flow. Similarly, while the flow for process 200 shows values and parameters being stored in specific blocks, it is to be understood that they may be stored at any appropriate point in the flow. As mentioned above, known methodologies may be used to generate the interest rate paths and the discount factors, and to compute the cashflow paths and the OAS or price, as performed, for example, by the at least one other computer 144 and associated components.

Figure 3:
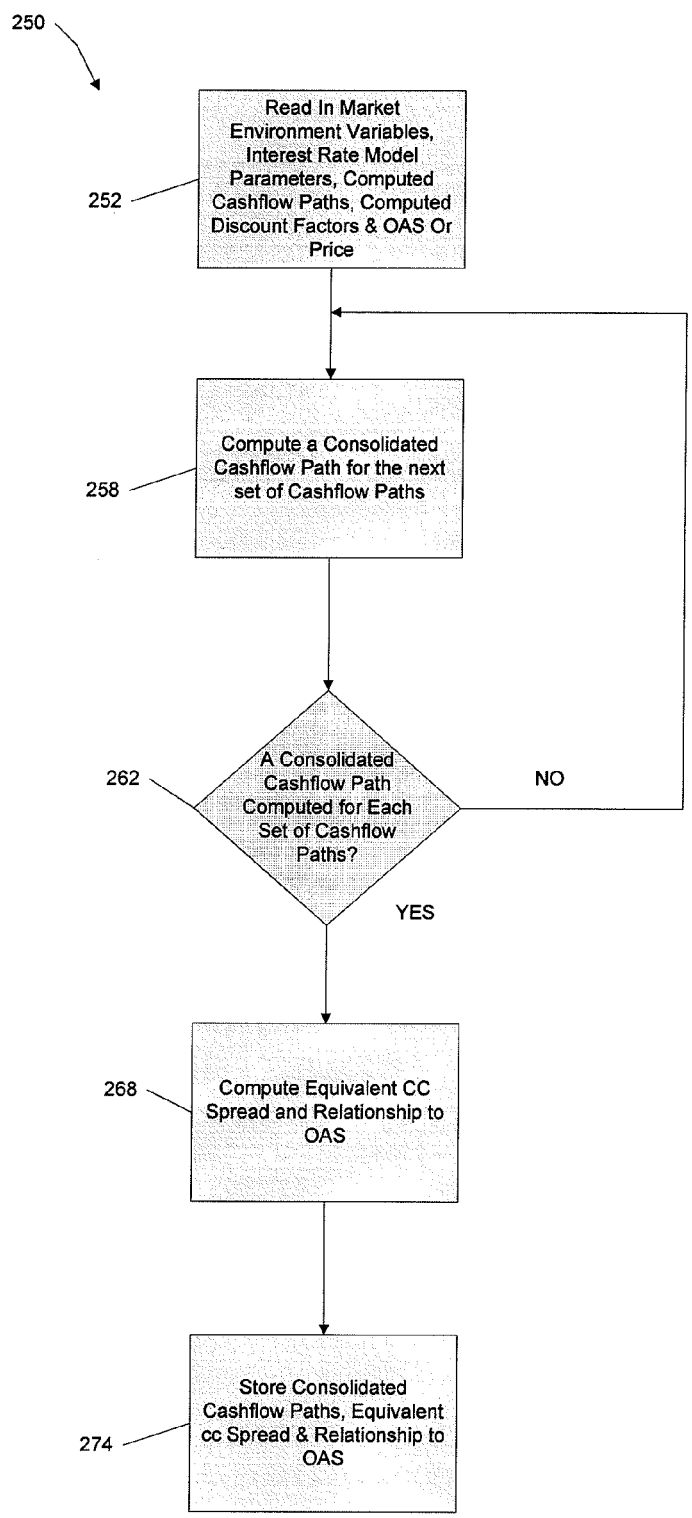
FIG. 3 is a flow diagram of a process for generating/computing consolidated cashflows and other parameters for use in computing the price of an MBS instrument according to one or more embodiments of the invention.

FIG. 3 illustrates an exemplary flow for an embodiment of process 250 for computing a consolidated cashflow from the cashflow paths computed by the process 200 for each market scenario and the equivalent cc spread. According to one or more embodiments of the invention, process 250 may be performed approximately when the processing for process 200 is performed, e.g., in a first stage of processing and based on the same market environment.

Various data and variables are input or read into the process in block 252, including: the cashflow paths and the OAS or price. While process flow 250 shows these as being read in the process within one block, it is to be understood that they may be read in at any appropriate point in the flow.

In the "do loop" represented by blocks 258 and 262, a single consolidated cashflow path CF(i) (Expression 6) is computed for the set of interest rate paths of each scenario based on the discount factors D(i,j) and the cashflows CF(i,j) for each payment date i and path j computed by process 200. (The expressions CF(i), etc., are discussed below.) In block 268, the equivalent cc spread ($s_c$) is computed based on input or computed OAS or price and the consolidated cashflows CF(i), and the relationship between the equivalent cc spread and the computed or input OAS is computed, which are stored in block 274.

Figure 4:
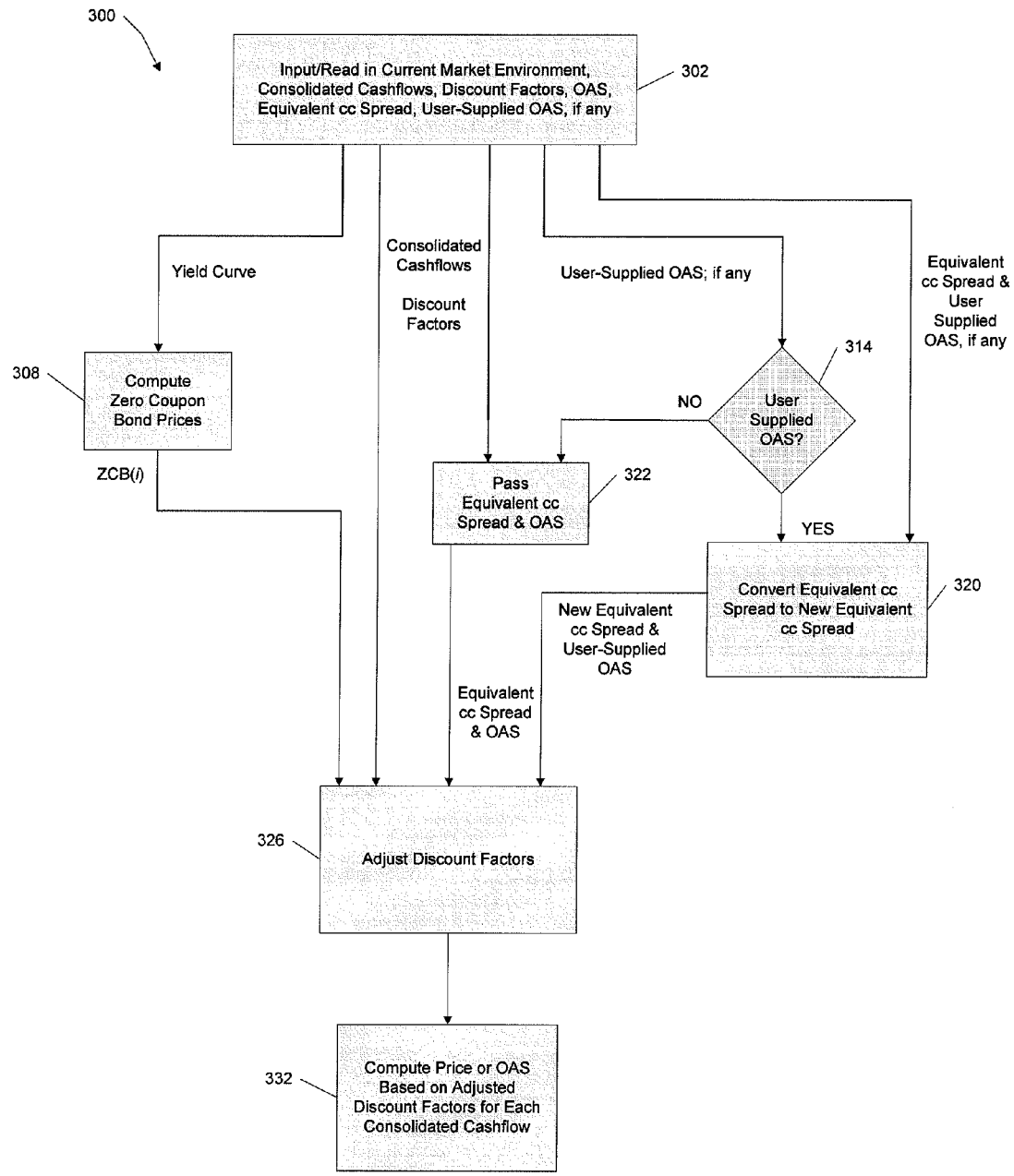
FIG. 4 is a flow diagram of a process for generating/computing the price of the MBS instrument based on adjusted the discount factors, the current market environment and any user-supplied parameters, according to one or more embodiments of the invention.

FIG. 4 illustrates an exemplary flow for an embodiment of process 300 for computing price based on the computed consolidated cashflows and an equivalent cc spread. In one or more embodiments of the invention, this processing may performed at a time or interval when the market environment is expected to have changed from the market environment at the time of running processes 200 and 250, i.e., in a second stage of processing.

In block 302, the current market environment is input, and the consolidated cashflows, the equivalent cc spread, the OAS, the discount factors stored by processes 200 and 250 are read into process 300. A user-supplied OAS, if any, may be input in block 302. While the flow for process 300 shows these as being read in the process within one block, it is to be understood that they may be read in at any appropriate point in the flow.

In block 308, the zero coupon bond price (ZCB(i)) is computed based on the yield curve input with the current market environment. (See, for example, Expressions 5 and 6). In block 314, if a new user-supplied OAS was input, then in block 320 compute a new equivalent cc spread and pass this spread and the user-supplied OAS to block 326, else in block 322 pass the read-in equivalent cc spread to block 326.

In block 326, the read-in discount factors are adjusted based on the zero coupon bond prices (ZCB(i)) and the equivalent cc spread or the new equivalent c spread. In block 332, a price is computed for each scenario based on the adjusted discount factors, the read-in equivalent cc spread and the consolidated cashflow for the scenario. Once the user-supplied OAS is converted to the equivalent c/c spread, this spread can be applied to the discount factors derived from the current yield curve and the zero coupon bond prices. These discount factors are not stochastic as they are fully specified by the current curve, so no interest rate model is involved. The discount factors are adjusted via expressions below using the equivalent c/c spread, and these adjusted discount factors are used to discount the consolidated cashflows.

According to some embodiments of the invention: no interest rate modeling is needed at the time of valuation; only pre-generated consolidated cashflows are used without the need of expensive cashflow generation at the time of valuation; and/or only consolidated cashflow are stored without the need for expensive storage of many cashflow paths (one for each simulation path).

In other embodiments, price, option adjusted spread, effective duration, key rate durations, and other metrics for MBS instruments are computed in such a manner that an investor can specify the market environment (e.g., pick a specific type and date of a yield curve or provide a custom curve) as well as change the inputs for the analysis (price or OAS and receive results in a timely manner. In such cases, a different yield curve may be used to generate and discount cashflows. For example, a swap curve may be used to generate cashflows while a treasury curve is used to discount cashflows. In the process flow of FIG. 4, these parameters may be input in block 302, and passed to blocks 308, 320 and 326 as appropriate.

Once computed, the price of the MBS and any other variables, e.g., OAS, effective duration, key rate duration, and other metrics, may be displayed on a computer screen, electronically mailed, printed to a report, or output in a similar manner. The price, along with any of the other variables described herein, may be stored in memory, a database, transmitted over a network or networks, and/or displayed on a, for example, desktop computer, monitor, or portable device, or transmitted to a printer for printing.

According to one or more embodiments of the invention various computations involved in pricing on MBS are performed by the at least one computer 144 in accordance with algorithms implementing one or more of the following mathematical expressions.

Price is computed given an OAS, or an OAS is computed given a price, by the at least one computer 144, as follows: Price is the average of present values of cashflows of all paths, and the price based on the given OAS, PV(s), may be expressed as follows:

$$PV(s) = \frac{1}{N}\sum_{j=1}^{N}\sum_{i=1}^{M} CF(i, \omega_j) D(i, \omega_j; s),$$ (Expression 1)

where, $s$ is spread (OAS), and $CF(i, \omega_j)$, and $D(i; \omega_j; s)$ are the cashflows and discount factors at time $t_i$ (i=1, 2, ..., M) and path j (j=1, 2, ..., N), respectively.

For spread $s_c$ on continuously compounded zero or forward curve, the discount factors may be represented by:

$$D(i,\omega_j;s_c) = D(i,\omega_j)e^{-s_c t_i}.$$ (Expression 2)

The spread adjusted path-wise discount factor, $D(i,\omega_j)e^{-s_c t_i}$ expresses the product of path-wise discount factor and path independent spread discount factor. The price based on the spread $s_c$, $PV(s_c)$, may be expressed as follows:
From Expression 1 and Expression 2, $$PV(s_c) = \frac{1}{N}\sum_{j=1}^{N}\sum_{i=1}^{M} CF(i, \omega_j) D(i, \omega_j) e^{-s_c t_i}$$ (Expression 3)

$$= \sum_{i=1}^{M} \left[\frac{1}{N}\sum_{j=1}^{N} CF(i, \omega_j) D(i, \omega_j)\right] e^{-s_c t_i}.$$

$$= \sum_{i=1}^{M} \overline{CF}(i) ZCB(i) e^{-s_c t_i}.$$ (Expression 4)

Where $\overline{CF}(i)$ represents a consolidated cashflow, which may be expressed as follows:

$$\overline{CF}(i) = \frac{1}{ZCB(i)} \left[\frac{1}{N}\sum_{j=1}^{N} CF(i, \omega_j) D(i, \omega_j)\right],$$ (Expression 5)

where ZCB(i) is price of a zero coupon bond at time 0 with maturity $t_i$, i.e.

$$ZCB(i) = \frac{1}{N}\sum_{j=1}^{N} D(i, \omega_j).$$ (Expression 6)

Expression 2, which decomposes spread adjusted path-wise discount factor into the product of path-wise discount factor and path independent factor, is used to obtain Expression 4 from Expression 1. For spread $s_f$ on semi-annual compounded forward curve:

$$D(i, \omega_j; s_f) = D(i-1, \omega_j; s_f)\left[1 + \frac{f(i, \omega_j) + s_f}{2}\right]^{-2(t_i - t_{i-1})}$$ (Expression 7)

$$= D(0, \omega_j; s_f)\prod_{k=1}^{i}$$

$$\left[1 + \frac{f(k, \omega_j) + s_f}{2}\right]^{-2(t_k - t_{k-1})}$$

$$= \prod_{k=1}^{i}\left[1 + \frac{f(k, \omega_j) + s_f}{2}\right]^{-2(t_k - t_{k-1})}$$

$$= \prod_{k=1}^{i}\left[1 + \frac{f(k, \omega_j)}{2}\right]^{-2(t_k - t_{k-1})}$$

$$\prod_{k=1}^{i}\left[1 + \frac{s_f/2}{1 + f(k, \omega_j)/2}\right]^{-2(t_k - t_{k-1})}$$

$$= D(i, \omega_j)\prod_{k=1}^{i}\left[1 + \frac{s_f/2}{1 + f(k, \omega_j)/2}\right]^{-2(t_k - t_{k-1})}.$$

since $D(0, \omega_j; s_f) = 1$

If $f(k, \omega_j) = \overline{f}$, which is path and time independent, and defining $\overline{\alpha}$ as $$\overline{\alpha} = [1 + \overline{f}/2]^{-1},$$ (Expression 8)

then, Expression 7 becomes:

$$D(i, \omega_j; s_f) = D(i, \omega_j)\prod_{k=1}^{i}[1 + \overline{\alpha}s_f/2]^{-2(t_k - t_{k-1})}$$ (Expression 9)

$$= D(i, \omega_j)[1 + \overline{\alpha}s_f/2]^{-2t_i}.$$

Similar to Expression 2, Expression 9 decomposes forward spread adjusted path-wise discount factors into product of two factors: one path dependent and another path-independent. Therefore, price, $PV(s_f)$, based on the semi-annual compounded forward spread becomes:

$$PV(s_f) = \frac{1}{N}\sum_{j=1}^{N}\sum_{i=1}^{M} CF(i,\omega_j)D(i,\omega_j)[1+\overline{\alpha}s_f/2]^{-2t_i} \quad \text{(Expression 10)}$$

$$= \sum_{i=1}^{M}\left[\frac{1}{N}\sum_{j=1}^{N} CF(i,\omega_j)D(i,\omega_j)\right][1+\overline{\alpha}s_f/2]^{-2t_i}$$

$$= \sum_{i=1}^{M} \overline{CF}(i)ZCB(i)[1+\overline{\alpha}s_f/2]^{-2t_i}$$

Based on Expressions 4 and 10:

$$e^{-s_c t_i} = [1+\overline{\alpha}s_f/2]^{-2t_i}. \quad \text{(Expression 11)}$$

$$\overline{\alpha}^1 = \frac{s_f}{2}[e^{s_c/2}-1]^{-1}. \quad \text{(Expression 12)}$$

$$\overline{f} = 2[\overline{\alpha}^{-1}-1] \quad \text{(by Expression 8)}$$

$$= s_f\lceil e^{s_c/2}-1\rceil^{-1}-2$$

When $s_f$ is small:

$$\overline{f}\approx 2(s_f/s_c-1). \quad \text{(Expression 13)}$$

Price/OAS based on consolidated cashflow is computed as follows according to one or more embodiments of the invention.

In accordance with one or more embodiments of the invention, all of the cashflow paths of a scenario are converted to a single, consolidated cashflow, which is used as an approximation to compute price/OAS when the yield curve is unchanged or changed slightly. This may be expressed according to one embodiment, as follows:

Compute the Consolidated Cashflow.
1. Based on type of calculation, compute price (PV ($s_f$)) or OAS ($s_f$) as usual.
2. Compute consolidated cashflow $\overline{CF}(i)$ based on Expressions 5 and 6.
3. Let PV ($s_f$)=PV ($s_c$), and solve for continuously compounded OAS ($s_c$) based on Expression 4.
4. Discount the consolidated cashflow with a new yield curve that is close to the original one.

Compute Price PV ($\hat{s}_f$) with OAS $\hat{s}_f$:
1. convert $\hat{s}_f$ to $\hat{s}_c$ based on Expression 12 or 13 for approximation.
2. PV ($\hat{s}_f$)=PV ($\hat{s}_c$), compute price based on Expression 4, where D(i) is the discount factors of the new yield curve.

Compute OAS $\hat{s}_f$ price PV ($\hat{s}_f$):
1. In PV ($\hat{s}_f$)=PV ($\hat{s}_c$), solve for based on Expression 4, where D(i) is the discount factors of the new yield curve.
2. convert $\hat{s}_c$ to $\hat{s}_f$ based on Expression 12 or 13 for approximation.

Using the Consolidated Cashflow on Other Yield Curves

The discussion above assumes that the same yield curve is used to both generate and discount cashflows. However, cashflows may be generated by one yield curve (for example, a swap curve S23), and discounted by another yield curve (for example, a treasury curve I111). The first yield curve, that generates the interest rates dynamics and cashflows, is referred to as the dynamic curve, and the second yield curve, that discounts the cashflows, is referred to as the discount curve.

The path-wise discount factors of the discount curve are computed so that the path-wise cashflows can be discounted accordingly. The previously computed (or "precanned") cashflows (based on the dynamic curve) and discount curve are used to compute price/OAS. According to one or more embodiments, these are carried out as follows. Assume that path-wise discount factors of the discount curve $D^{(2)}$ (i, ωj) is obtained by adjusting path-wise discount factors of the dynamic curve $$D^{(2)}(i,\omega_j)=D(i,\omega_j)A(i), \quad \text{(Expression 14)}$$

where D(i, $\omega_j$) is the path-wise discount factor of the first yield curve, and A(i) is the per time-step adjustment. Then $$ZCB^{(2)}(i) = \frac{1}{N}\sum_{j=1}^{N} D^{(2)}(i,\omega_j) \quad \text{by Expression 6}$$

$$= \frac{1}{N}\sum_{j=1}^{N} D(i,\omega_j)A(i) \quad \text{by Expression 14}$$

$$= ZCB(i)A(i).$$

Therefore, $$A(i) = \frac{ZCB^{(2)}(i)}{ZCB(i)} \quad \text{(Expression 15)}$$

To discount the consolidated cashflow generated from the dynamic curve (Expression 16)

$$PV^{(2)}(s_c^{(2)}) = \sum_{i=1}^{M}\left[\frac{1}{N}\sum_{j=1}^{N}\frac{CF(i,w_j)}{D^{(2)}(i,w_j)}\right]e^{-s_c^{(2)}t_i} \quad \text{by Expression 3}$$

$$= \sum_{i=1}^{M}\left[\frac{1}{N}\sum_{j=1}^{N}\frac{CF(i,w_j)}{D(i,w_j)}\right]A(i)e^{-s_c^{(2)}t_i} \quad \text{by Expression 14}$$

$$= \sum_{i=1}^{M} \overline{CF}(i)ZCB(i)A(i)e^{-s_c^{(2)}t_i}. \quad \text{by Expressions 5 and 6}$$

$$= \sum_{i=1}^{M} \overline{CF}(i)ZCB^{(2)}(i)e^{-s_c^{(2)}t_i}. \quad \text{by Expression 14}$$

(Expression 17)

Similarly, $$PV^{(2)}(s_f^{(2)}) = \sum_{i=1}^{M} \overline{CF}(i)ZCB^{(2)}(i)\left[\frac{1+}{\overline{\alpha}^{(2)}s_f^{(2)}/2}\right]^{-2t_i}$$

Compute adjusted path-wise discount factors $D^{(2)}(i,\omega)$, and compute price: (PV ($s_f^{(2)}$) or OAS ($s_f^{(2)}$), as usual.

Compute: $s_c^{(2)}$ by solving PV ($s_f^{(2)}$)=PV ($s_c^{(2)}$)

The remaining computations are the same as those for a dynamic yield curve case, as above under the "Compute Price" and "Compute OAS" headings, depending on whether price or OAS is desired.

Approximated MBS instrument prices computed as described herein drastically reduces the storage capacity required to store cashflow data. Instead of storing as many cashflows as the number of simulation interest rate paths, only one consolidated cashflow per scenario is stored. Also, the speed of the analysis is significantly improved, even under different user input scenarios, since expensive simulation of interest rate paths is replaced by adjustment of the discount factors based on the specified yield curve (which can be calculated very quickly)

Tests have demonstrated that the accuracy of approximated MBS instrument prices computed as described herein is suitable for commercial use and more accurate than the two-stage prior approached described above.

While the invention has been described and illustrated in connection with embodiments, many variations and modifications as will be evident to those skilled in this art may be made without departing from the spirit and scope of the invention as defined by the claims, and the invention is thus not to be limited to the precise details of methodology or construction set forth above. For example, the invention has application to securities, derivatives, instruments, etc., other than MBS instruments. Also, interest rate models other than those referenced herein may be used, and interest rate paths, cashflow paths and discount factors may be computed in different ways not described herein. It is to be understood that such variations and modifications are intended to be included within the scope of the invention as defined by the claims.

The invention claimed is:

1. A method for obtaining a price for a financial instrument whose value is based on a plurality of future cashflows that are dependent on prevailing market financial interest rates, the method being performed by a computer system comprising at least one computer, at least one computer readable storage medium comprising at least one of memory accessible by the at least one computer and at least one computer readable storage device, the at least one computer readable storage medium storing thereon at least programming which causes the at least one computer to perform the method, the method comprising:

computing, by the at least one computer, based on a market environment, one or more consolidated cashflow paths, each from a plurality of simulated cashflow paths, each based on a simulated interest rate path of a plurality of simulated interest rate paths;

computing, by the at least one computer, discount factors using a spread to a continuously compounded interest rate curve equivalent to a provided or computed OAS ("equivalent cc spread") and a relationship between the equivalent cc spread and an option adjusted spread (OAS); and discounting, by the at least one computer, one or more consolidated cashflows obtained from the one or more consolidated cashflow paths using the computed discount factors.

2. The method of claim 1, wherein computing the one or more consolidated cashflows comprises computing, by the at least one computer, the one or more consolidated cashflows based on a first market environment, and wherein computing the discount factors comprises computing, by the at least one computer, first discount factors based on the first market environment and adjusting the first discount factors based on a second market environment, the equivalent cc spread and the relationship between the equivalent cc spread and the OAS to provide the discount factors.

3. The method of claim 2, comprising computing, by the at least one computer, the one or more cashflow paths based on the simulated interest rate path and the first market environment.

4. The method of claim 2, wherein computing the first discount factors and adjusting the first discount factors comprises computing the first discount factors after closing of financial markets on one day and adjusting the first discount factors on demand on the day after the one day.

5. The method of claim 1, comprising:

computing, by the at least one computer, in a first stage based on a first market environment the one or more cashflow paths, the one or more consolidated cashflow paths, the discount rates and the equivalent cc spread and the relationship between the equivalent cc spread and the OAS, wherein computing the discount factors comprises computing, by the at least one computer, first discount factors based on the first market environment;

storing the one or more consolidated cash flows the first discount factors, the equivalent cc spread and the relationship between the equivalent cc spread and the OAS on the at least one storage medium;

computing, by the at least one computer, in a second stage based on a second market environment, the discount factors adjusted based on the stored first discount factors, the equivalent cc spread and the relationship between the equivalent cc spread and the OAS; and computing, by the at least one computer, pricing of the instrument based on the discount factors and the stored one or more consolidated cashflows.

6. A system for obtaining a price for a financial instrument whose value is based on a plurality of future cashflows that are dependent on prevailing market financial interest rates, the system comprising at least one computer, at least one computer readable storage medium comprising at least one of memory accessible by the at least one computer and at least one computer readable storage device, the at least one computer readable storage medium storing thereon at least programming which causes the at least one computer to at least;

compute, based on a market environment, one or more consolidated cashflow paths, each from a plurality of simulated cashflow paths, each used on a simulated interest rate path of a plurality of simulated interest rate paths;

compute discount factors using a spread to a continuously compounded interest rate curve equivalent to a provided or computed OAS ("equivalent cc spread") and a relationship between the equivalent cc spread and an option adjusted spread (OAS); and discount one or more consolidated cashflows obtained from the one or more consolidated cashflow paths using the computed discount factors.

7. The system of claim 6, wherein computing by the at least one computer of the one or more consolidated cashflows comprises computing the one or more consolidated cashflows based on a first market environment, and wherein computing by the at least one computer of the discount factors comprises computing first discount factors based on the first market environment, and adjusting the first discount factors based on a second market environment, the equivalent cc spread and the relationship between the equivalent cc spread and the OAS to provide the discount factors.

8. The system of claim 7, wherein the at least one computer computes the one or more cashflow paths based on the first market environment.

9. The system of claim 7, wherein computing the first discount factors and adjusting the first discount factors comprises the at least one computer computing the first discount factors after closing of financial markets on one day and the at least one computer adjusting the first discount factors on demand on the day after the one day.

10. The system of claim 6, wherein the at least one computer:
- computes in a first stage based on a first market environment, the one or more cashflow paths, the one or more consolidated cashflow paths, the discount rates and the equivalent cc spread and the relationship between the equivalent cc spread and the OAS, wherein computing the discount factors comprises computing first discount factors based on the first market environment;
- stores in the at least one storage medium the one or more consolidated cashflows, the first discount factors, the equivalent cc spread and the relationship between the equivalent cc spread and the OAS;
- computes in a second stage based on a second market environment, the discount factors adjusted based on the stored first discount factors, the equivalent cc spread and the relationship between the equivalent cc spread and the OAS; and
- computes pricing of the instrument based on the discount factors and the stored one or more consolidated cashflows.

11. A computer program product comprising at least one computer readable storage medium storing thereon at least computer readable code which can cause at least one computer to perform a method comprising:
- computing, based on a market environment, one or more consolidated cashflow paths, each from a plurality of simulated cashflow paths, each based on a simulated interest rate path of a plurality of interest rate paths;
- computing discount factors using a spread to a continuously compounded interest rate curve equivalent to a provided or computed OAS ("equivalent cc spread") and a relationship between the equivalent cc spread and an option adjusted spread (OAS); and
- discounting one or more consolidated cashflows obtained from the one or more consolidated cashflow paths using the computed discount factors.

12. The computer program product of claim 11, wherein computing the one or more consolidated cashflows comprises computing the one or more consolidated cashflows based on a first market environment, and wherein computing the discount factors comprises computing first discount factors based on the first market environment and adjusting the first discount factors based on a second market environment, the equivalent cc spread and the relationship between the equivalent cc spread and the OAS to provide the discount factors.

13. The computer program product of claim 12, comprising computing the one or more cashflow paths based on the first market environment.

14. The computer program product of claim 12, wherein computing the first discount factors and adjusting the first discount factors comprises computing the first discount factors after closing of financial markets on one day and adjusting the first discount factors on demand on the day after the one day.

15. The computer program product of claim 11, comprising:
- computing in a first stage based on a first market environment, the one or more cashflow paths, the one or more consolidated cashflow paths, the discount rates and the equivalent cc spread and the relationship between the equivalent cc spread and the OAS, wherein computing the discount factors comprises computing first discount factors based on the first market environment on the at least one storage medium;
- storing the one or more consolidated cashflows, the first discount factors, the equivalent cc spread and the relationship between the equivalent cc spread and the OAS on the at least one storage medium;
- computing in a second stage based on a second market environment, the discount factors adjusted based on the stored first discount factors, the equivalent cc spread and the relationship between the equivalent cc spread and the OAS; and
- computing pricing of the instrument based on the discount factors and the stored one or more consolidated cashflows.

* * * * *